United States Patent
Bieman et al.

[11] Patent Number: 6,122,062
[45] Date of Patent: Sep. 19, 2000

[54] 3-D CAMERA

[75] Inventors: Leonard H. Bieman, Waterford; Gary Rutledge, Clarkston, both of Mich.

[73] Assignee: FANUC Robotics North America, Inc., Rochester Hills, Mich.

[21] Appl. No.: 09/303,887

[22] Filed: May 3, 1999

[51] Int. Cl.$^7$ ..................................................... G01B 11/24
[52] U.S. Cl. ........................... 356/376; 356/380; 356/402
[58] Field of Search .................................... 356/376, 350, 356/402

[56] References Cited

U.S. PATENT DOCUMENTS

| | | |
|---|---|---|
| 2,384,260 | 9/1945 | Goldsmith . |
| 2,763,852 | 9/1956 | Henrich . |
| 2,825,263 | 3/1958 | Dockhorn . |
| 2,825,264 | 3/1958 | Dockhorn . |
| 4,102,578 | 7/1978 | Suzuki et al. . |
| 4,212,073 | 7/1980 | Balasubramanian . |
| 4,323,920 | 4/1982 | Collender . |
| 4,525,858 | 7/1985 | Cline et al. . |
| 4,641,972 | 2/1987 | Halioua et al. . |
| 4,794,550 | 12/1988 | Greivenkamp, Jr. . |
| 4,939,380 | 7/1990 | Berger et al. . |
| 5,072,215 | 12/1991 | Brotz . |
| 5,175,601 | 12/1992 | Fitts . |
| 5,189,493 | 2/1993 | Harding . |
| 5,436,462 | 7/1995 | Hull-Allen . |
| 5,471,308 | 11/1995 | Zeien . |
| 5,559,603 | 9/1996 | Wakai et al. . |
| 5,581,352 | 12/1996 | Zeien . |
| 5,629,773 | 5/1997 | Wakai et al. . |
| 5,636,025 | 6/1997 | Bieman et al. . |
| 5,646,733 | 7/1997 | Bieman . |
| 5,708,498 | 1/1998 | Rioux et al. . |
| 5,774,219 | 6/1998 | Matsuura . |

OTHER PUBLICATIONS

Atkinson et al., "A Novel Approach To Optical Range Finding", 1986, pp. 237–243.

*Primary Examiner*—Frank G. Font
*Assistant Examiner*—Reginald A. Ratliff
*Attorney, Agent, or Firm*—Howard & Howard

[57] ABSTRACT

A 3-D camera system (10) includes a light source (12) and a grating (14) spaced at a predetermined distance from the light source (12). The light source (12) and grating (14) project a shadow of the grating (14) on an object (16). Images of the object (16) with the grating (14) shadows projected thereon are captured by a sensor (18) in a video camera (17). A processor (19) converts the images to a three dimensional bit map of the object (16). The light source (12) includes a plurality of at least three rows of light sources (20) defining a matrix (22) whereby different rows of the matrix (22) may be illuminated to produce different grating (14) shadows on the object (16).

15 Claims, 4 Drawing Sheets

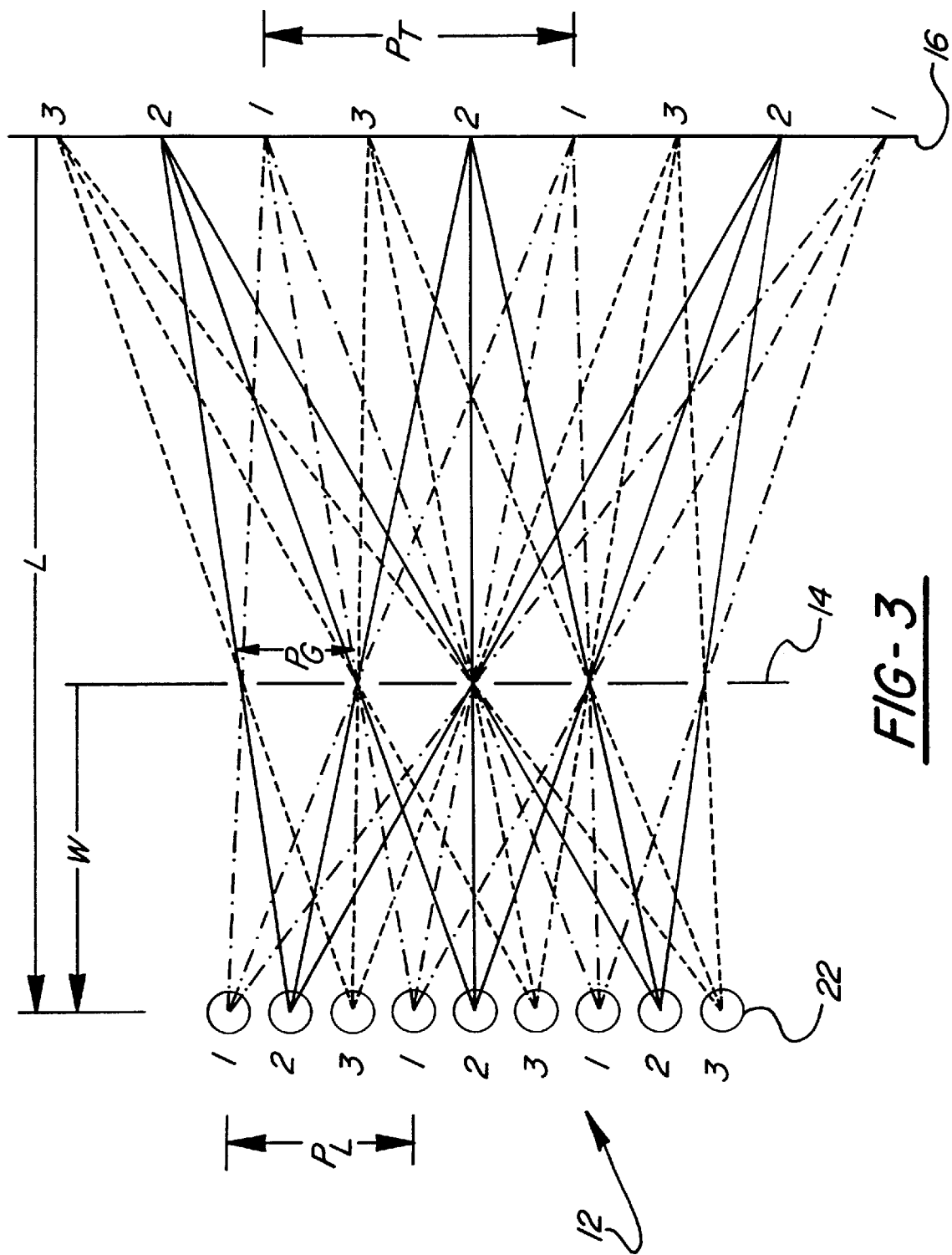

3-D CAMERA

BACKGROUND OF THE INVENTION

1. Field of the Invention

This invention relates to a 3-D camera system and to a method for shifting the grating shadow used in creating three-dimensional images.

2. Description of the Prior Art

Using Phase Shifting Interferometry to create a three dimensional bit-map image of an object is well known in the art, and typically includes a light source, lens and a grating which are used to project an image of the grating onto the object being imaged. This method of creating a three dimensional image requires the taking of three or more different images of the object. The projected pattern in each image is shifted to create three images of the object with unique light patterns projected on the object. By knowing what the shift is between images, and using trigonometric equations based on the distances between the light source, lens, grating, object, and imaging system, a processor creates a three dimensional bit-map of the object.

The most common way of shifting the projected pattern from one image to the other has been to move the grating. U.S. Pat. No. 5,646,733 to Bieman, and U.S. Pat. No. 4,212,073 to Balasubramanian disclose this method of shifting the grating pattern. This can be achieved by attaching the grating to a servo motor or some other suitable means to move the grating. Other methods have been utilized such as projecting the light through clear substrates having multiple bands of liquid crystal, as disclosed in U.S. Pat. No. 5,581, 352 to Zeien. The bands of liquid crystal are selectively activated to create varying shadow patterns as the light is projected through them. Another method involves the use of a grating in combination with a clear glass plate, as disclosed in U.S. Pat. No. 5,471,308 to Zeien. The glass plate is rotated on an axis by way of a servo motor. The result is to cause the image of the grating to shift as it is projected through the lens. Although simple enough to achieve, these methods have historically made three dimensional imaging systems costly. The additional equipment needed to facilitate the movement of components in the systems described above also makes the systems bulky, and not appropriate for applications where the system must be compact and mobile. Waiting for the mechanical movement to shift the grating image also adds time to the process.

SUMMARY OF THE INVENTION AND ADVANTAGES

The present invention relates to a 3-D camera system including a light source and a grating spaced at a predetermined distance from the light source for projecting a shadow of the grating on an object. Images of the object with the grating shadows projected thereon are captured by a sensor and processed to create a three dimensional image of the object. The present invention is characterized by the light source including a plurality of at least three rows of light sources defining a matrix whereby different rows of the matrix may be illuminated to produce different grating shadows on the object.

Another aspect of the present invention relates to a method for shifting the grating shadow over an object to be imaged. The first image is created by illuminating a specific row or group of rows of the light matrix to create a first shadow pattern on the object to be imaged. The shadow pattern is shifted by deactivating the first row or group of rows of the light matrix, and illuminating a second row or group of rows of the light matrix. Because the second row or group of rows of the light matrix are shifted from the first row or group of rows of the light matrix, the shadow pattern projected onto the object is also shifted. A third shadow pattern is created by deactivating the second row or group of rows of the light matrix, and illuminating a third row or group of rows of the light matrix. The third row or group of rows of the light matrix are shifted from the first and second, thereby projecting a third shifted shadow pattern on the object.

Accordingly, the present invention will create shifted shadow patterns on an object that is to be three dimensionally imaged in a quick and cost effective manner which will also allow the overall system to remain compact and thereby appropriate for applications where the system must be portable and moveable. The present invention uses a matrix of light sources to create a shadow on an object to be imaged. Different rows of the matrix are illuminated to create different shadow patterns on the object. The light matrix consists of a plurality of point light sources, which can be simple LED light sources. These LED light sources are cheap, and once the light matrix has been set up, will not require any movement. This reduces the amount of equipment in the system as there is no need for any mechanical movement. The light sources can be illuminated selectively to create the different shadow patterns almost instantly. There is no additional time spent to allow the grating pattern to be moved, or to allow liquid crystal bands to be activated and deactivated. Since there are no moving parts to the system, the present invention can be set-up easily and is portable. Once this is done, the system can be moved to different locations or even mounted onto a machine to be used on a moving line, or robotic application.

The present invention involves fewer components, none of which are required to move during the imaging process which makes the present invention portable and moveable; and rows of the light matrix can be illuminated selectively to create the different shadow patterns almost instantly. These characteristics make it possible to create three dimensional images of an object cheaply and quickly, using an imaging system that is both compact and mobile.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a schematic diagram of the distance relationships between the object, the grating, the light source, the pitch of the grating, and the pitch of the light matrix.

DETAILED DESCRIPTION OF THE PREFERRED EMBODIMENT

Figure 1:
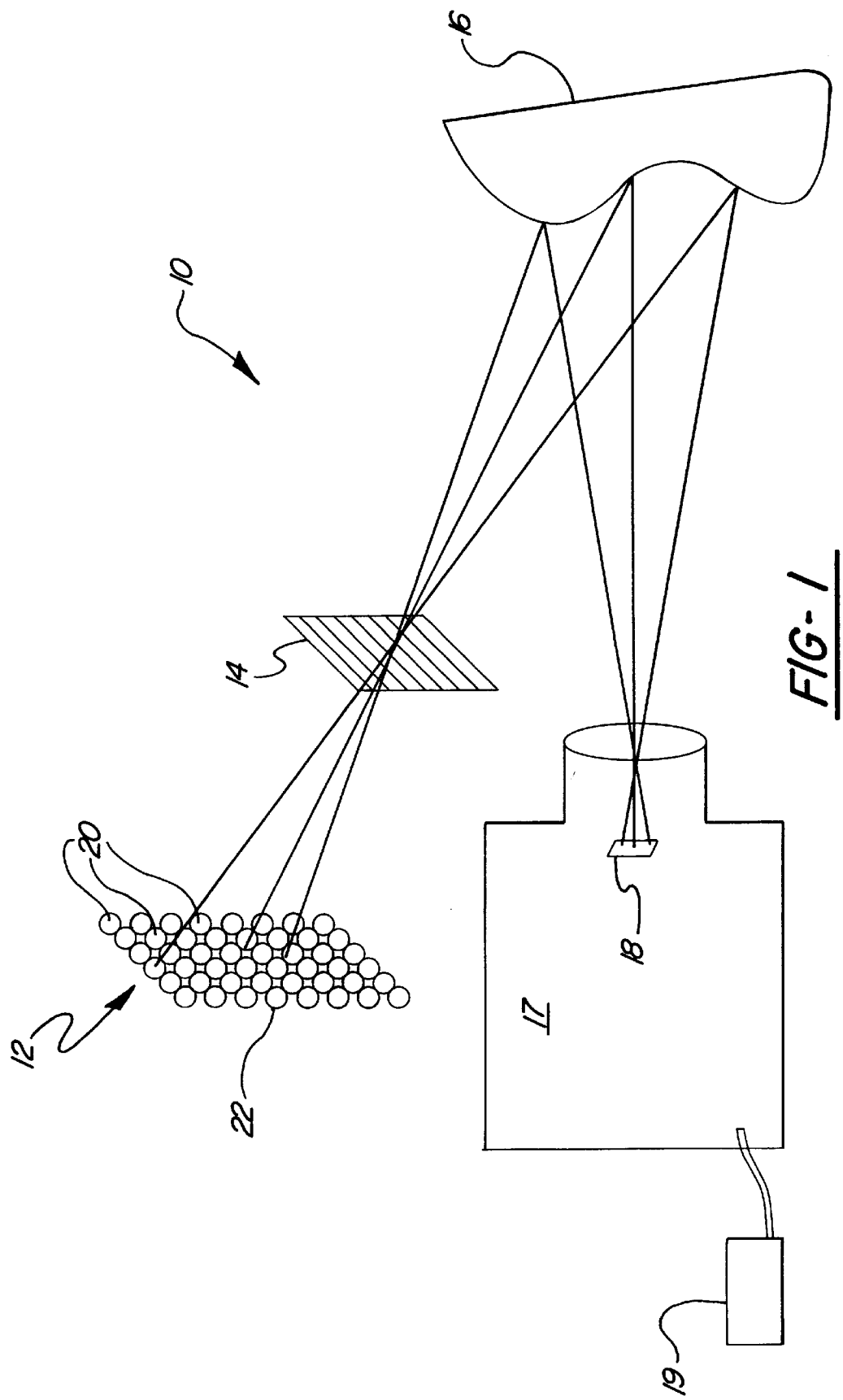
FIG. 1 is a schematic diagram of the 3-D camera system.

Referring to the Figures, wherein like numerals indicate like or corresponding parts throughout the several views, FIG. 1 generally shows a three-dimensional, or 3-D, camera system 10. The system 10 includes a light source 12 and a grating 14. The grating 14 is spaced at a predetermined distance and position relative to the light source 12. Light is projected from the light source 12 onto the grating 14 to create a shadow of the grating 14 on an object 16 that is to be imaged by the three-dimensional camera system 10. A video camera 17 includes a sensor 18 for capturing the images of the object 16 with the grating shadows projected on the object 16 and stores the images in a processor 19 to be converted into a three dimensional bit map of the object 16. In the preferred embodiment, the sensor 18 is a two-dimensional imaging array, however, as would be known to those skilled in the art, the sensor 18 could be a one-dimensional imaging array, such as a line scan camera, which would produce a depth map alone a single line, or a single detector, which would provide the depth information at one point.

Figure 2:
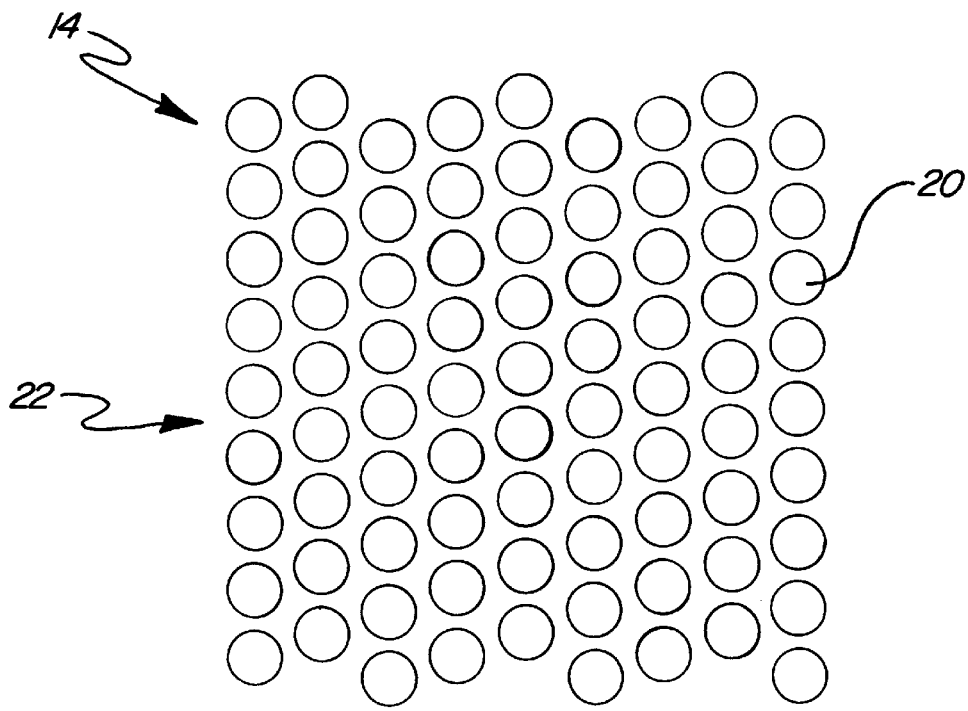
FIG. 2 is a preferred embodiment of a matrix of light sources.

The system 10 is characterized by the light source 12 including a plurality of at least three rows of light sources 20 defining a matrix 22 whereby different rows may be illuminated to produce different grating shadows on the object 16. The matrix 22 of light sources 20 can be comprised of a stack of three or more horizontally oriented line light emitting light stripes such as slab laser diodes, or long filament incandescent lamps. The matrix 22 of light sources 20 can also be comprised of a matrix 22 of rows of discreet point light sources 20 such as light emitting diodes, or laser diodes. In the preferred embodiment, the light source 12 comprises a plurality of rows of light emitting diodes that emit infrared light. FIG. 2 shows a light matrix 22 with 27 rows of infrared light emitting diodes, each row including three individual infrared light emitting diodes. Obviously, the light sources 12 and/or the grating 14 may be arranged in any orientation, i.e., horizontally or vertically, to cast the light and shadow in the object 16. Alternatively, there may be provided first and second light sources 12 arranged to projected intensified light on the object 16 and selectively illuminated to produce a common overlapping shadow on the object 16.

In operation, with a light matrix 22 consisting of three rows of light emitting diodes, the first row of light emitting diodes are illuminated which creates a shadow of the grating 14 on the object 16 that is to be three-dimensionally imaged. The image of the object 16 with the first grating shadow projected on it is captured by sensors 18 and saved in a processor 19. After the first image is captured and saved, the light emitting diodes of the first row in the light matrix 22 are deactivated and the light emitting diodes of the second row of lights in the light matrix 22 are illuminated. The second row of lights creates a second grating shadow on the object 16 that is being imaged. The image of the object 16 with the second grating shadow on it is captured and saved to the processor 19. The process is repeated with the third row of lights, and a third image of the object 16 is captured and saved to the processor 19. The processor 19 converts the information from the three images into a three dimensional bit map of the object 16. A three dimensional bit map of an object 16 is created by taking three or more images of a shadow pattern projected on that object 16 while shifting the position or phase of the projected shadow pattern. This process is known to those skilled in the art as Phase Shifting Interferometry and is disclosed in U.S. Pat. Nos. 4,641,972 and 4,212,073, which are hereby incorporated by reference to this specification.

Figure 2A:
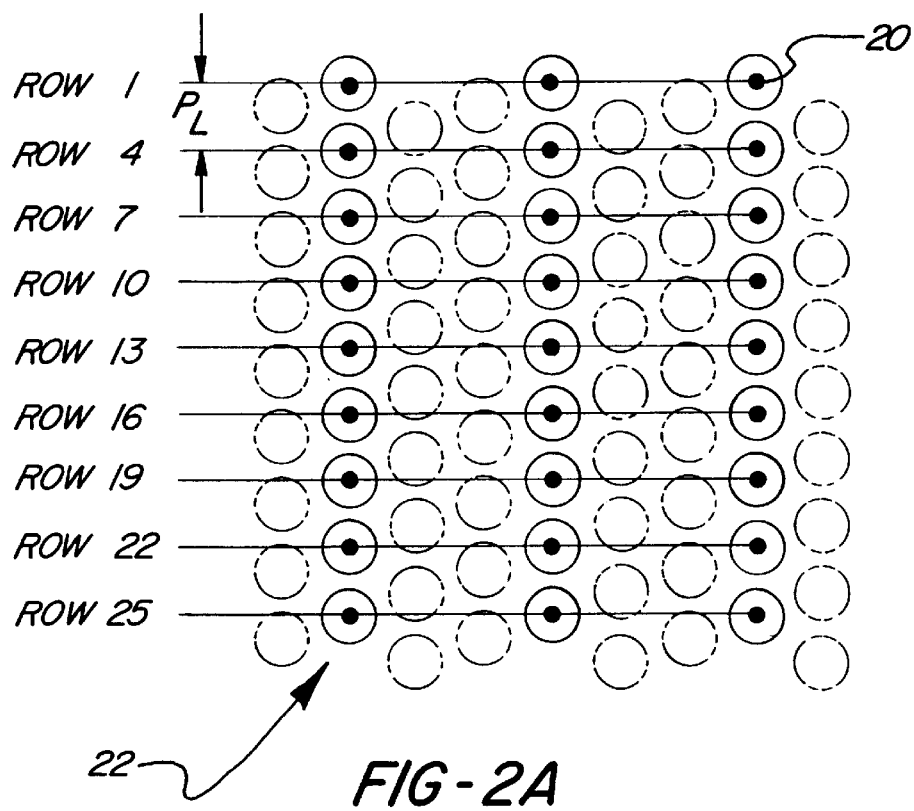
FIG. 2a is the preferred embodiment of a matrix of light sources showing specific rows being illuminated to create a first grating shadow.
Figure 2B:
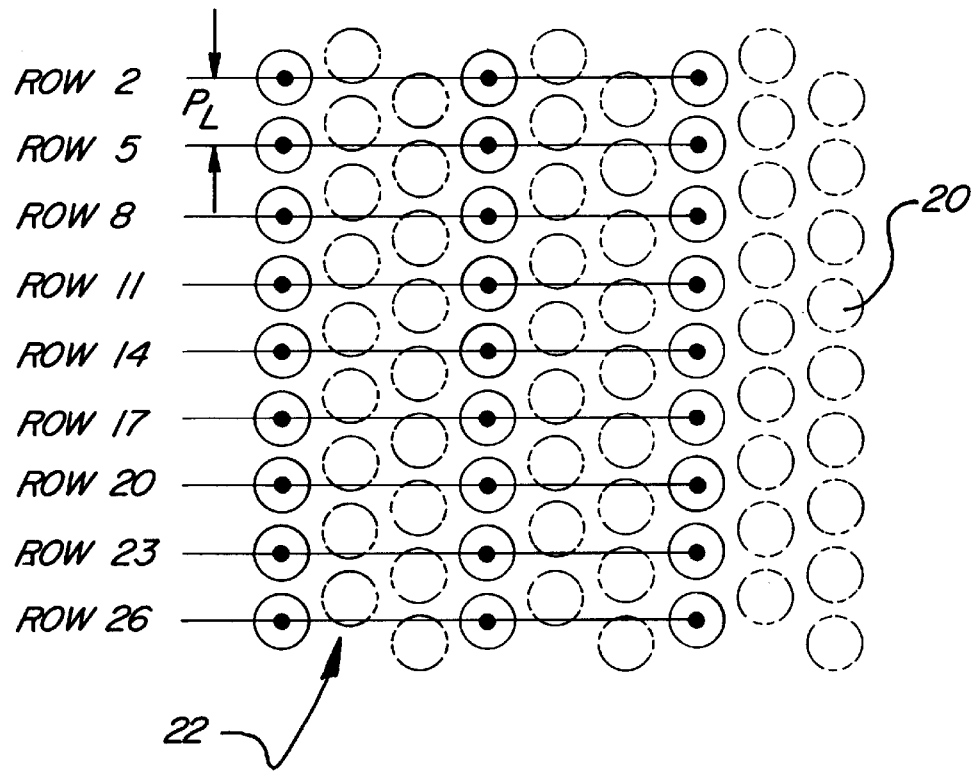
FIG. 2b is the preferred embodiment of a matrix of light sources showing specific rows being illuminated to create a second grating shadow.
Figure 2C:
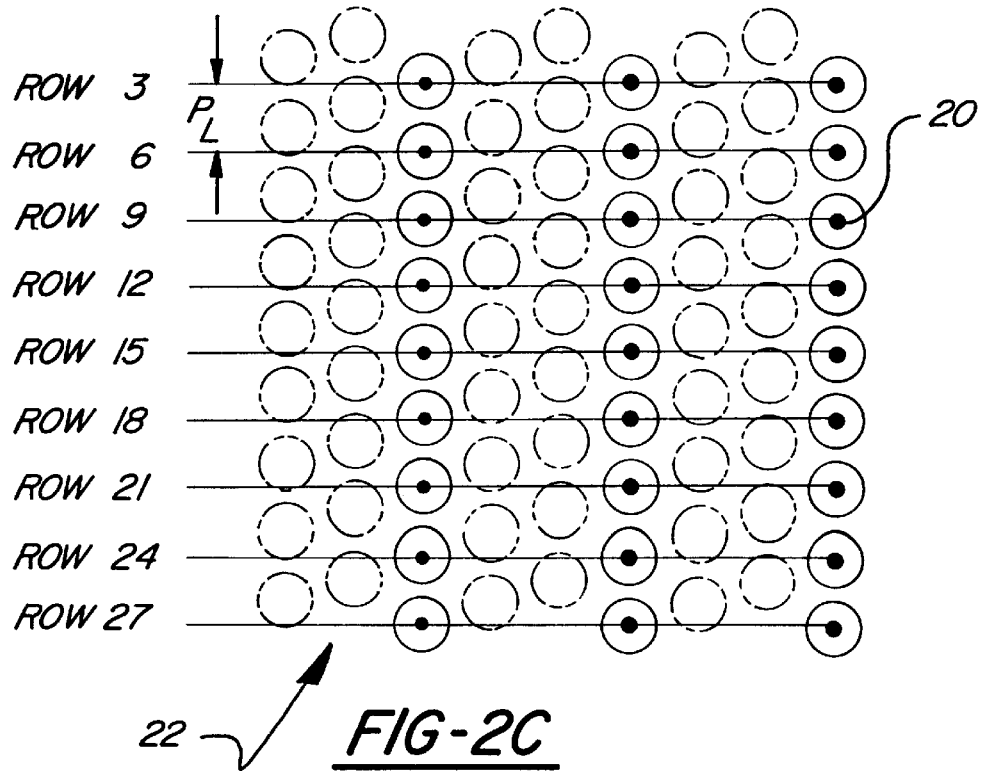
FIG. 2c is the preferred embodiment of a matrix of light sources showing specific rows being illuminated to create a third grating shadow.

Referring to FIG. 2a, in the preferred embodiment the three infrared light emitting diodes of row 1 are illuminated as well as the three infrared light emitting diodes in every third row thereafter. Hence, the 1st, 4th, 7th, 10th, 13th, 16th, 19th, 22nd, and 25th rows are illuminated, as shown in FIG. 2a, to create the first grating shadow on the object 16 to be imaged. The distance between the 1st and 4th rows is the pitch of the light pattern or $P_L$. The distance between the openings in the grating 14 is the pitch of the grating or $P_G$. The grating pitch and the pitch of the light pattern are such that when the light matrix 22 is placed a specific distance, W, from the grating 14 and a specific distance, L, from the projection plane, the pattern projected by the 1st row is the same as the pattern projected by the 4th row, or the 7th row, and so on. Therefore, when the 1st row of lights is illuminated along with every third row thereafter, a grating shadow is created that is the same as one that would be created by illuminating the 1st row of lights alone, but at a higher intensity. Correspondingly, to create the second grating shadow the 2nd, 5th, 8th, 11th, 14th, 17th, 20th, 23rd, and 26th rows of light are illuminated, as illustrated in FIG. 2b, and to create the third grating shadow the 3rd, 6th, 9th, 12th, 15th, 18th, 21st, 24th, and 27th rows are illuminated, as illustrated in FIG. 2c.

It is to be understood that the shifting of the shadow pattern as described above can be achieved by any number of combinations of rows. For instance, the shifting of the shadow pattern could be obtained by illuminating rows 1, 2, 4, 5, 7, 8 . . . and so forth for the first image; illuminating rows 2, 3, 5, 6, 8, 9 . . . and so forth for the second image; and finally illuminating rows 3, 4, 6, 7, 9, 10 . . . and so forth for the third image. This particular lighting sequence would create three different images with the shadow pattern shifted by a phase. The phase that the shadow pattern is shifted is established by the relationship between the spacing of the rows in the light matrix 22, the pitch of the grating 14, the distance between the light matrix 22 and the grating 14, and the distance between the grating 14 and the object 16 that is to be imaged.

Referring to FIG. 3, the equations for the pitch of the shadow pattern at the projected target, $P_T$, and the pitch of the grating, $P_G$, as a function of the pitch of the light matrix, $P_L$; the distance between the light matrix 22 and the target, L; and the distance between the light matrix 22 and the grating 14, W are as follows:

$$P_L/L = P_G/(L-W) \qquad \text{Eq. 1}$$

$$P_G/W = P_T/L \qquad \text{Eq. 2}$$

Combining equation 1 with equation 2 yields:

$$P_T = P_L((L/W)-1) \qquad \text{Eq. 3}$$

$$P_G = P_L(1-(W/L)) \qquad \text{Eq. 4}$$

where, pitch of the grating, $P_G$, is the distance from the edge of an opening in the grating 14 to the corresponding edge of the next opening in the grating 14. The light pattern pitch, $P_L$, is the distance between the first row labeled 1 and the next row labeled 1. The distance from the light matrix 22 to the grating 14 is W, and the distance from the light matrix 22 to the projection plane is L.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A 3-D camera system for creating a three dimensional image of an object comprising:

a light source for projecting light on the object;

a grating spaced at a predetermined position relative to said light source for creating a grating shadow defining an image upon the object;

said system characterized by said light source including a plurality of at least three rows of light sources defining a matrix whereby different rows may be selectively illuminated to produce at least three different grating shadows on the object.

2. The 3-D camera system of claim 1 including a video camera having a sensor for viewing the object and capturing each of said selective images produced by said grating shadows on the object.

3. The 3-D camera system of claim 2 including a processor for converting the images of the object with the shadows projected thereon into a three dimensional bit map of the object.

4. The 3-D camera system of claim 3 wherein said sensor includes a two-dimensional imaging array.

5. The 3-D camera system of claim 3 wherein said sensor includes a line scan sensor defining a one-dimensional imaging array for producing a bit map along a single line.

6. The 3-D camera system of claim 3 wherein said sensor includes a single detector for producing a bit map at a single point.

7. The 3-D camera system of claim 1 wherein said light source includes a plurality of at least three slab diode lasers.

8. The 3-D camera system of claim 1 wherein said light source includes a plurality of at least three horizontally oriented light stripes which emit a line of light.

9. The 3-D camera system of claim 1 wherein said discreet point light sources are discreet point light sources defined by light emitting diodes.

10. The 3-D camera system of claim 1 wherein said discreet point light sources are discreet point light sources defined by laser diodes.

11. The 3-D camera system of claim 1 wherein said light source emits infrared light.

12. A method for shifting a grating shadow over an object to be imaged by a 3-D camera comprising the steps of:

lighting a first row of lights to create a first grating shadow on the object;

lighting a second row of lights spaced from said first row to create a second grating shadow on the object; and lighting a third row of lights spaced from said second row to create a third grating shadow on the object.

13. A method for shifting a grating shadow over an object to be imaged by a 3-D camera comprising the steps of:

providing a light matrix including a plurality of rows of light sources, said plurality being a multiple of three;

lighting a first row and every third row thereafter of said light matrix to create a first grating shadow on the object;

lighting a second row spaced from said first row and every third row thereafter of said light matrix to create a second grating shadow on the object;

lighting a third row spaced from the second row and every third row thereafter of said light matrix to create a third grating shadow on the object.

14. A method for shifting a grating shadow over an object to be imaged by a 3-D camera comprising the steps of:

providing a light matrix including a plurality of rows of light sources;

lighting a first group of said rows of said light matrix to create a first grating shadow on the object;

lighting a second group of said rows of said light matrix to create a second grating shadow on the object;

lighting a third group of said rows of said light matrix to create a third grating shadow on the object.

15. A 3-D camera system for creating a three dimensional image of an object comprising:

a first light source for projecting light on the object;

a second light source for projecting light on the object;

a grating spaced at a predetermined position relative to said light sources for creating a grating shadow defining an image upon the object;

said system characterized by said first and second light sources defining a matrix whereby said first and second light sources may be selectively illuminated to increase the intensity of light on the object and produce an overlapping common shadow on the object.

* * * * *